US008481915B2

(12) United States Patent
Otsuka et al.

(10) Patent No.: US 8,481,915 B2
(45) Date of Patent: Jul. 9, 2013

(54) OPTICAL ENCODER

(75) Inventors: Takanori Otsuka, Utsunomiya (JP);
Michio Nakamura, Utsunomiya (JP);
Mikiya Teraguchi, Kawasaki (JP)

(73) Assignee: Mitutoyo Corporation, Kanagawa (JP)

( * ) Notice: Subject to any disclaimer, the term of this patent is extended or adjusted under 35 U.S.C. 154(b) by 240 days.

(21) Appl. No.: 13/069,790

(22) Filed: Mar. 23, 2011

(65) Prior Publication Data

US 2011/0233389 A1      Sep. 29, 2011

(30) Foreign Application Priority Data

Mar. 24, 2010   (JP) ................................ 2010-067532

(51) Int. Cl.
*G01D 5/34* (2006.01)
(52) U.S. Cl.
USPC .................... 250/231.13; 341/13; 341/111
(58) Field of Classification Search
USPC .............. 250/231.13, 231.14, 231.16, 566,
250/239; 356/614, 616, 619; 341/11, 13,
341/111
See application file for complete search history.

(56) References Cited

U.S. PATENT DOCUMENTS

| 5,241,173 | A | 8/1993 | Howley et al. |
| 6,236,325 | B1 | 5/2001 | Kuroki et al. |
| 6,897,435 | B2 * | 5/2005 | Remillard et al. ........ 250/231.13 |
| 7,116,252 | B2 * | 10/2006 | Teraguchi ..................... 341/118 |
| 7,550,710 | B2 * | 6/2009 | McAdam ................. 250/231.13 |
| 2005/0280563 | A1 | 12/2005 | Teraguchi |

FOREIGN PATENT DOCUMENTS

| EP | 0 514 081 | 11/1992 |
| JP | 05-133732 | 5/1993 |
| JP | 2000-193489 | 7/2000 |
| JP | 2006-003307 | 1/2006 |
| WO | 03/034000 | 4/2003 |

OTHER PUBLICATIONS

Extended European Search Report from the European Patent Office (E.P.O.), dated Aug. 4, 2011.
U.S. Appl. No. 13/088,601 to Osamu Kawatoko et al., filed Apr. 18, 2011.

\* cited by examiner

*Primary Examiner* — Kevin Pyo
(74) *Attorney, Agent, or Firm* — Greenblum & Bernstein, P.L.C.

(57) ABSTRACT

An linear encoder includes: a scale; a light-emitting element that emits light onto the scale; a detecting head that has a light-receiving element that receives the light emitted by the light-emitting element to be reflected or transmitted by the scale; and a connector connected to the detecting head via a cable. The connector comprises a display that displays a status of the light received by the light-receiving element and a connector controller that controls the display. The connector controller includes a display controller that controls the display in accordance with the intensity of the light received by the light-receiving element.

6 Claims, 6 Drawing Sheets

FIG.7 the light-receiving element, in which the connector comprises a display that displays a status of the light received by the light-receiving element and a controller that controls the display, and the controller comprises a display controller that controls the display based on an electric signal outputted in accordance with the intensity of the light received by the light-receiving element.

OPTICAL ENCODER

The entire disclosure of Japanese Patent Application No. 2010-067532 filed Mar. 24, 2010 is expressly incorporated by reference herein.

BACKGROUND OF THE INVENTION

1. Field of the Invention

The present invention relates to an optical encoder.

2. Description of Related Art

A typically known optical encoder includes: a scale having latticed scale markings; a detecting head having a light-emitting element that emits light onto the scale and a light-receiving element that receives the light emitted by the light-emitting element to be reflected or transmitted by the scale; and a connector connected to the detecting head via a cable. The optical encoder measures the position of the detecting head relative to the scale based on the light received by the light-receiving element (see, for instance, Patent Literature 1: JP-A-2006-3307).

The optical encoder disclosed in the Patent Literature 1 includes a scale base (scale), a detector head (detecting head) and an output connector (connector) and measures the position of the detecting head relative to the scale.

When the optical encoder is used, a user attaches the scale and the detecting head respectively to two objects to be measured that are relatively displaceable. At this time, the scale and the detecting head have to be attached in an appropriate positional relationship so that the light emitted from the light-emitting element is reflected or transmitted by the scale and received by the light-receiving element and the intensity of the light received by the light-receiving element comes within a predetermined range.

Specifically, an optical encoder disclosed in Patent Literature 2 (JP-A-05-133732) includes an LED (Light Emitting Diode) provided on a read head, the LED changing emission color thereof based on an electric signal outputted by a light-receiving element in accordance with a distance (positional relationship) between a scale and the read head. A user can adjust the positional relationship between the scale and the read head by visually checking the emission color of the LED while moving the read head relative to the scale.

However, according to the optical encoder disclosed in the Patent Literature 2, since the user has to visually check the emission color of the LED while moving the read head relative to the scale, the positional relationship between the scale and the detecting head cannot be easily adjusted. Further, depending on the attachment position of the read head onto the object, it is difficult for the user to visually check the emission color of the LED, so that the positional relationship between the scale and the detecting head cannot be easily adjusted.

SUMMARY OF THE INVENTION

An object of the invention is to provide an optical encoder that allows easy adjustment of a positional relationship between a scale and a detecting head.

An optical encoder according to an aspect of the invention includes: a scale that has latticed scale markings; a detecting head that has a light-emitting element that emits light onto the scale and a light-receiving element that receives the light emitted by the light-emitting element to be reflected or transmitted by the scale; and a connector connected to the detecting head via a cable, the optical encoder measuring a position of the detecting head relative to the scale based on the light received by the light-receiving element, in which the connector comprises a display that displays a status of the light received by the light-receiving element and a controller that controls the display, and the controller comprises a display controller that controls the display based on an electric signal outputted in accordance with the intensity of the light received by the light-receiving element.

According to the above arrangement, the connector includes the display for displaying the status of the light received by the light-receiving element and is connected to the detecting head via the cable. Accordingly, the display can be easily viewed even while the detecting head is moved relative to the scale. Thus, a user can easily adjust the positional relationship between the scale and the detecting head.

In the above aspect of the invention, it is preferable that the optical encoder is arranged as an incremental optical encoder that employs a multiphase sine wave signal with a predetermined center voltage as the electric signal, the controller comprises an amplitude calculator that calculates an amplitude of the multiphase sine wave signal based on the predetermined center voltage of the multiphase sine wave signal and an instantaneous value of the multiphase sine wave signal, and the display controller controls the display based on the amplitude of the multiphase sine wave signal calculated by the amplitude calculator.

The multiphase sine wave signal herein refers to one of multiphase sine wave signal, triphasic sine wave signal and four-phase sine wave signal. The triphasic sine wave signal and four-phase sine wave signal can be converted into the multiphase sine wave signal. In the following description, it is assumed that the multiphase sine wave signal is the multiphase sine wave signal.

According to the above arrangement, since the phase difference of the multiphase sine wave signal is 90 degrees, the amplitude calculator can calculate the amplitude of the multiphase sine wave signal based on the predetermined center voltage of the multiphase sine wave signal and an instantaneous value of the multiphase sine wave signal. Further, since the display controller controls the display based on the amplitude of the multiphase sine wave signal, the status of the light received by the light-receiving element can be displayed on the display without moving the detecting head relative to the scale. Thus, a user can further easily adjust the positional relationship between the scale and the detecting head.

In the above aspect of the invention, it is preferable that the connector is a substantially rectangular parallelepiped that has a terminal face at which a terminal is provided and a cable face provided opposite to the terminal face and receiving the cable, a slant portion that is slanted and narrowed toward the cable face is provided on an orthogonal face that is orthogonal to the terminal face and the cable face, and the display is provided on the slant face.

According to the above arrangement, since the display is provided on the slant portion, when, for instance, a plurality of the linear encoders are used for measurement with a plurality of connectors thereof being arranged in a predetermined direction and connected with external equipments, the display can be viewed in the direction of the cable face. Thus, a user can easily adjust the positional relationship between the scale and the detecting head even when a plurality of optical encoders are used for measurement.

In the above aspect of the invention, it is preferable that the controller comprises an intensity adjuster that adjusts at least one of an intensity of the light emitted from the light-emitting element or an intensity of the electric signal in accordance with the intensity of the light received by the light-receiving element, and the connector comprises operation units, each of the operation units being provided respectively on the orthogonal face and the cable face, the operation units effecting an adjustment of the intensity adjuster.

According to the above arrangement, since the controller includes the intensity adjuster that performs the adjustment in response to an operation on the operation units provided by button switches and the like, a user can automatically adjust at least one of the intensity of the light emitted by the light-emitting element or the intensity of the electric signal by operating the operation units.

Further, since each of the operation units is respectively provided on the orthogonal face and the cable face, when, for instance, a plurality of the linear encoders are used for measurement with a plurality of connectors thereof being arranged in a predetermined direction to be connected with external equipments, the operation units can be operated from the cable face. Thus, a user can easily adjust at least one of the intensity of the light emitted by the light-emitting element and the intensity of the electric signal even when a plurality of optical encoders are used for measurement.

Further, by providing the controller with the amplitude calculator and the display controller that controls the display based on the amplitude of the multiphase sine wave signal calculated by the amplitude calculator, a user can adjust at least one of the intensity of the light emitted by the light-emitting element and the intensity of the electric signal without moving the detecting head relative to the scale after operating the operation unit.

In the above aspect of the invention, it is preferable that the controller comprises a signal adjuster that, after the adjustment by the intensity adjuster is done, adjusts the electric signal, and the connector comprises a notifier that notifies that the adjustment by the intensity adjuster is done.

According to the above arrangement, since the controller includes the signal adjuster that adjusts the signal after the adjustment of the intensity adjuster is done, a user can automatically adjust the electric signal by operating the operation unit.

Further, since the connector comprises a notifier that notifies that the adjustment by the intensity adjuster is done, a user can recognize the completion of the adjustment by the intensity adjuster.

Further, by providing the controller with the amplitude calculator and the display controller that controls the display based on the amplitude of the multiphase sine wave signal calculated by the amplitude calculator, a user can adjust at least one of the intensity of the light emitted by the light-emitting element and the intensity of the electric signal without moving the detecting head relative to the scale after operating the operation unit and can recognize the completion of the adjustment of the intensity adjuster with the assistance of the notifier. Then, upon recognizing the completion of the adjustment by the intensity adjuster with the assistance the notifier, the user moves the detecting head relative to the scale to adjust the electric signal. Thus, the user can easily adjust the intensity of the light emitted by the light-emitting element and the electric signal.

In the above aspect of the invention, it is preferable that the display is provided by three or more odd number of LEDs that are arranged in a predetermined direction, the display controller lighting: a center one of the LEDs when the intensity of the light received by the light-receiving element is within a predetermined range; a first-side one of the LEDs disposed at a first side relative to the center when the intensity of the light received by the light-receiving element surpasses the predetermined range; and a second-side one of the LEDs disposed at a second side relative to the center when the intensity is below the predetermined range.

According to the above arrangement, since the display is provided by arranging three or more odd number of LEDs in the predetermined direction and different ones of the LEDs is lit depending on the intensity of the light received by the light-receiving element, the status of the light received by the light-receiving element can be easily recognized only by viewing the display.

In the above aspect of the invention, it is preferable that the display is provided by two or more even number of LEDs that are arranged in a predetermined direction, the display controller lighting: two LEDs disposed at a center of the LEDs when the intensity of the light received by the light-receiving element is within a predetermined range; a first-side one of the LEDs disposed at a first side relative to the center when the intensity of the light received by the light-receiving element surpasses the predetermined range; and a second-side one of the LEDs disposed at a second side relative to the center when the intensity is below the predetermined range.

According to the above arrangement, since the display is provided by arranging two or more even number of LEDs in the predetermined direction and different one(s) of the LEDs is lit depending on the intensity of the light received by the light-receiving element, the status of the light received by the light-receiving element can be easily recognized only by viewing the display.

DETAILED DESCRIPTION OF PREFERRED EMBODIMENT(S)

First Exemplary Embodiment

Figure 1:
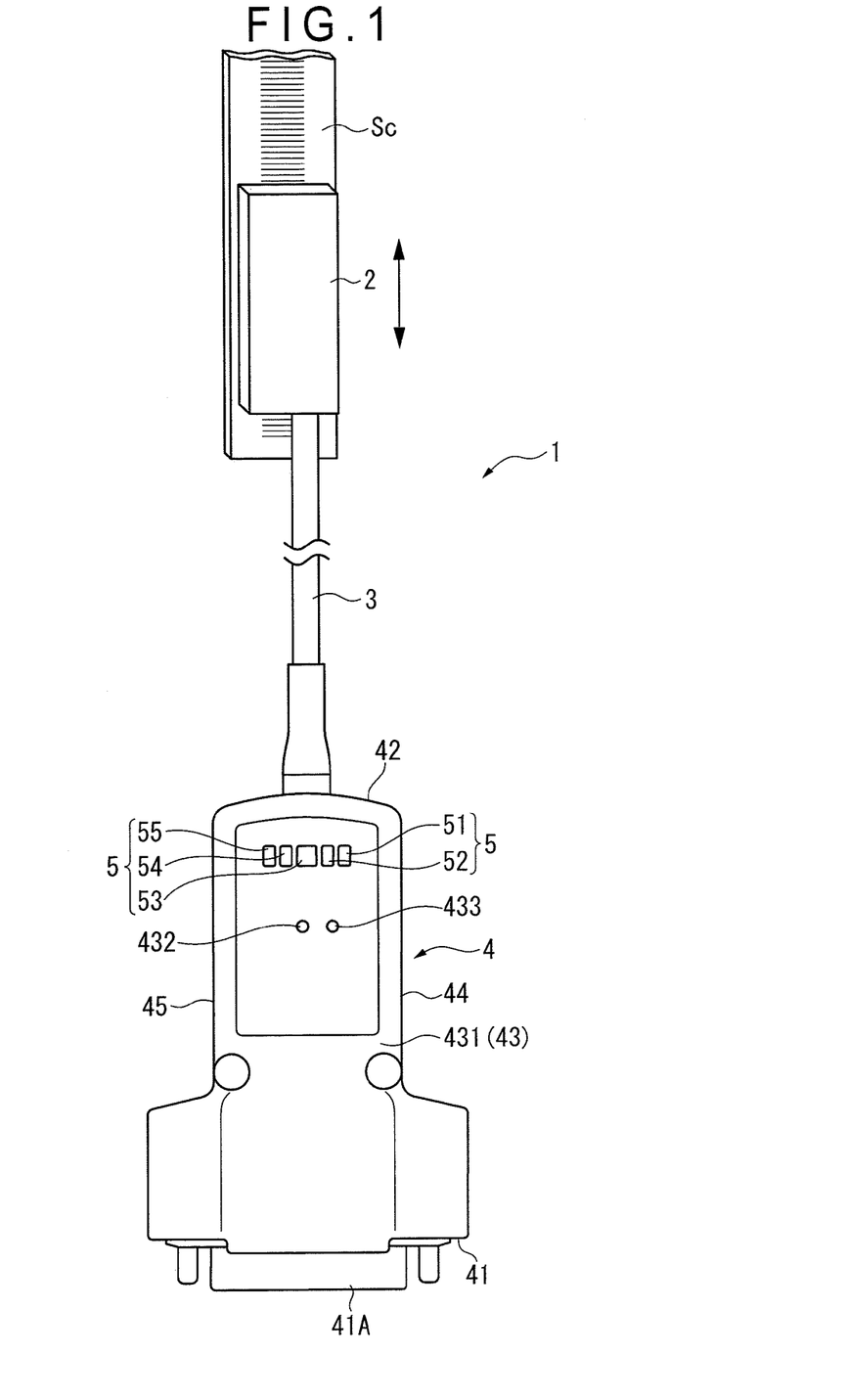
FIG. 1 is a plan view showing an optical encoder according to a first exemplary embodiment of the invention.
Figure 2:
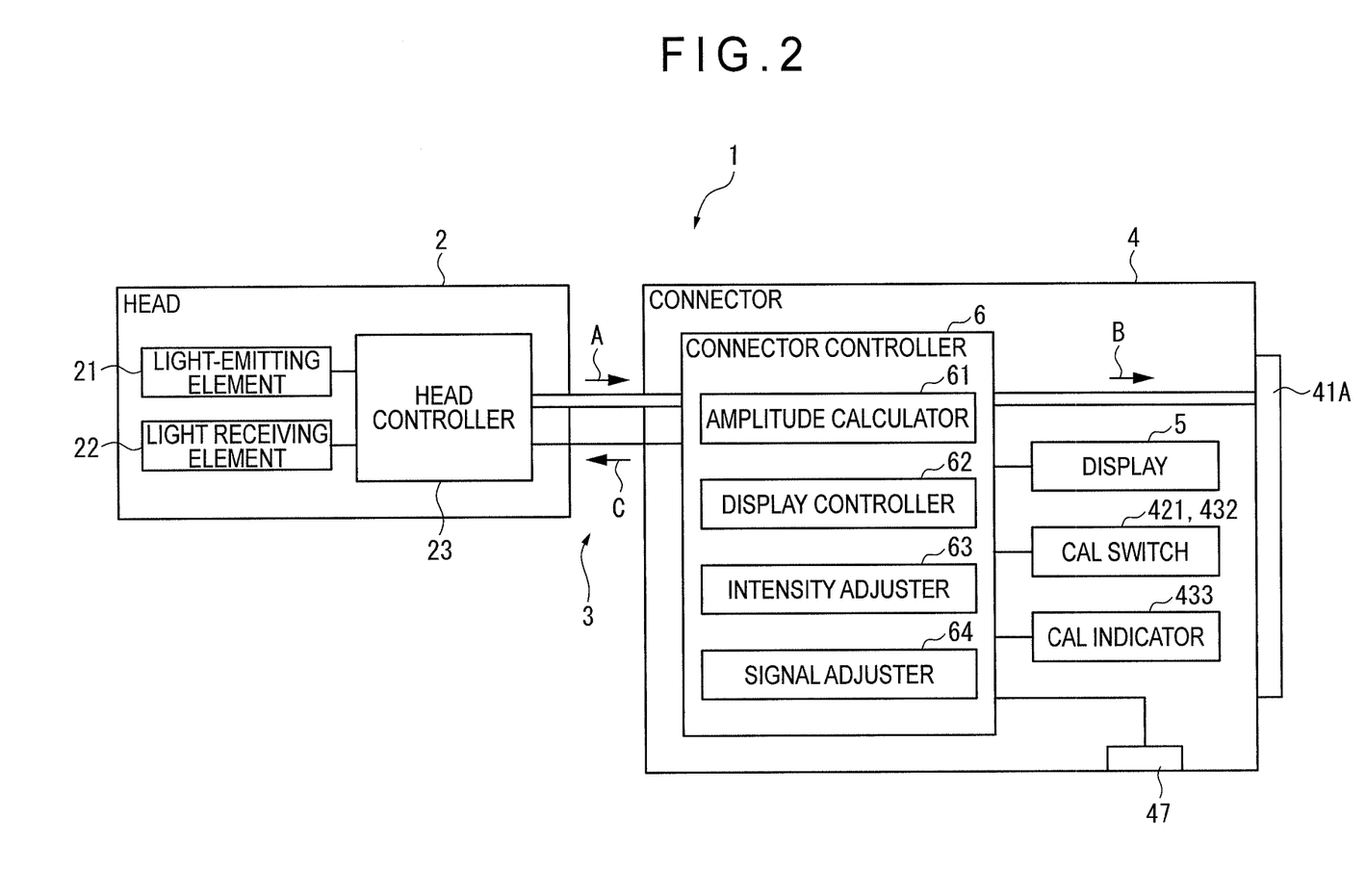
FIG. 2 is a block diagram showing an overall arrangement of the optical encoder according to the first exemplary embodiment.

A first exemplary embodiment of the invention will be described below with reference to the attached drawings.
General Arrangement of Optical Encoder FIG. 1 is a plan view showing an optical encoder according to the first exemplary embodiment of the invention. FIG. 2 is a block diagram showing an overall arrangement of the optical encoder.

As shown in FIGS. 1 and 2, a linear encoder 1 (optical encoder) includes: a scale Sc having a latticed scale markings; a rectangular parallelepiped detecting head 2 having a light-emitting element 21 (not shown in FIG. 1) that emits light onto the scale Sc and a light-receiving element 22 (not shown in FIG. 1) that receives the light emitted by the light-emitting element 21 and reflected by the scale Sc to output an electric signal; and a connector 4 connected to the detecting head 2 via a cable 3. The optical encoder measures the position of the detecting head 2 relative to the scale Sc based on the light received by the light-receiving element 22. Incidentally, the linear encoder 1 is arranged in a manner similar to the optical encoder disclosed in the Patent Literature 1 except for the connector 4.

As shown in FIG. 2, the detecting head 2 includes a head controller 23 that controls the light-emitting element 21 and the light-receiving element 22.

The head controller 23 is provided by, for instance, an ASIC (Application Specific Integrated Circuit). The head controller 23 controls an intensity of the light emitted from the light-emitting element 21 and outputs a multiphase sine wave signal with a predetermined center voltage in accordance with the intensity of the light received by the light-receiving element 22. The multiphase sine wave signal outputted by the head controller 23 is outputted to the connector 4 via the cable 3 (see an arrow A in FIG. 2). An external equipment (not shown) connected to the connector 4 measures the position of the detecting head 2 relative to the scale Sc based on the multiphase sine wave signal outputted by the connector 4 (represented by an arrow B in FIG. 2). Specifically, the linear encoder 1 is arranged as an incremental optical encoder that employs an electric signal of a multiphase sine wave signal with a predetermined center voltage.

Figure 3:
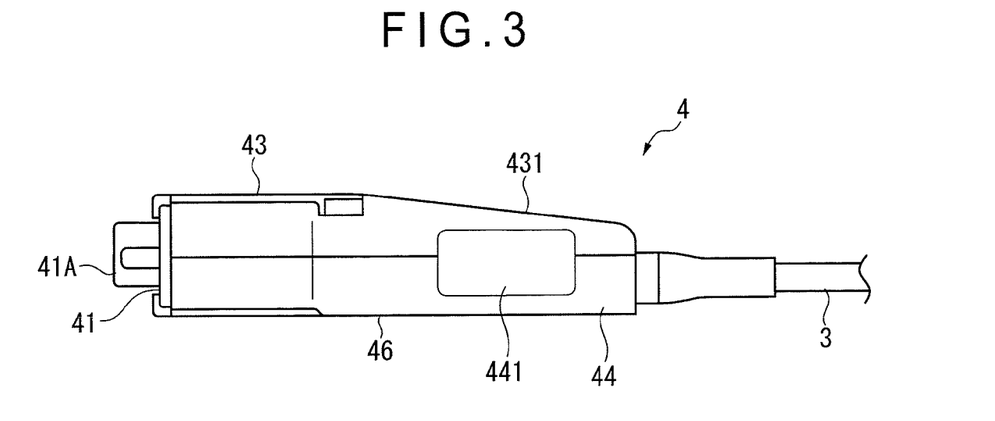
FIG. 3 is a side elevational view showing a connector according to the first exemplary embodiment.
Figure 4:
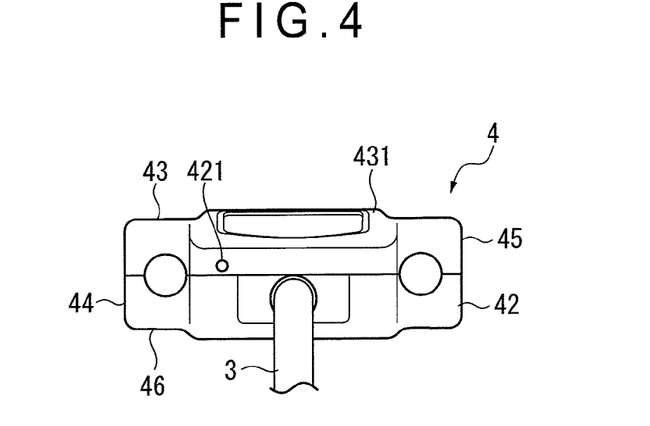
FIG. 4 illustrates the connector according to the first exemplary embodiment seen from a side at which a cable is connected.

FIG. 3 is a side elevational view showing the connector 4. FIG. 4 illustrates the connector 4 seen from a side at which the cable 3 is connected.

As shown in FIGS. 1, 3 and 4, the connector 4 is formed in a substantially rectangular parallelepiped that includes: a terminal face 41 at which a terminal 41A to be connected with the external equipment is provided; a cable face 42 for receiving the cable 3, the cable face 42 being provided opposite to the terminal face 41; and an upper face 43, lateral faces 44, 45 and a bottom face 46 orthogonal to the terminal face 41 and the cable face 42.

As shown in FIG. 4, a CAL (Calibration) switch 421 that serves as an operation unit for automatically adjusting the multiphase sine wave signal outputted in accordance with the intensity of the light emitted from the light-emitting element 21 and the intensity of the light received by the light-receiving element 22 is provided on the cable face 42. A user of the linear encoder 1 can adjust the linear encoder 1 by pushing the CAL switch 421.

As shown in FIGS. 1, 3 and 4, a flat slant portion 431 that is slanted and narrowed toward the cable face 42 is provided on the upper face 43 (orthogonal face).

As shown in FIG. 1, the slant portion 431 is provided with a display 5 that displays a status of the light received by the light-receiving element 22, a CAL switch 432 serving as an operation unit that functions in a manner similar to the CAL switch 421 and a CAL indicator 433 that serves as a notifier for notifying a status of the adjustment by the CAL switches 421 and 432. Incidentally, the CAL indicator 433 is provided by an LED.

As shown in FIG. 1, the display 5 is provided by five LEDs 51 to 55 that are arranged in parallel with the terminal face 41 and the cable face 42. The size of a center one of the LEDs (center LED) 53 is slightly larger than the size of the other LEDs 51, 52, 54 and 55.

The emission color of the center LED 53 is green; the emission color of LEDs 51 and 55 on both ends is red; and the emission color of the other LEDs 52 and 54 is orange.

As shown in FIG. 3, a rubber cover 441 is attached to the lateral face 44. The cover 441 covers a USB connector 47 (see FIG. 2). In other words, the USB connector 47 is usable when the cover 441 is detached.

As shown in FIG. 2, the connector 4 includes a connector controller 6 that is provided by an ASIC, microcomputer and the like and serves as a controller for controlling the display 5 and the like.

The connector controller 6 includes: an amplitude calculator 61; a display controller 62; an intensity adjuster 63; and a signal adjuster 64.

The amplitude calculator 61 calculates an amplitude of the multiphase sine wave signal based on the predetermined center voltage of the multiphase sine wave signal outputted by the head controller 23 and an instantaneous value of the multiphase sine wave signal.

The display controller 62 controls the display 5 based on the amplitude of the multiphase sine wave signal calculated by the amplitude calculator 61. In other words, the display controller 62 controls the display 5 based on the intensity of the light received by the light-receiving element 22.

Specifically, when the amplitude of the multiphase sine wave signal calculated by the amplitude calculator 61, i.e. the intensity of the light received by the light-receiving element 22, is within a predetermined range, the display controller 62 lights the center LED 53. When the intensity surpasses the predetermined range, the display controller 62 lights the LED 54 or 55 disposed at one side (left side in FIG. 1) relative to the center. When the intensity is below the predetermined range, the display controller 62 lights the LED 51 or 52 disposed at the other side (right side in FIG. 1) relative to the center.

Incidentally, the display controller 62 lights the LEDs 51 to 55 in a stepwise manner in accordance with the intensity of the light received by the light-receiving element 22. The intensity of the light is the smallest when the LED 51 is lit and is the largest when the LED 55 is lit. In other words, the display 5 displays the status of the light received by the light-receiving element 22.

The intensity adjuster 63 adjusts the intensity of the light emitted from the light-emitting element 21 in accordance with the intensity of the light received by the light-receiving element 22. Specifically, the intensity adjuster 63 calculates a correction value for the adjustment in accordance with the amplitude of the multiphase sine wave signal calculated by the amplitude calculator 61, and outputs a control signal (represented by an arrow C in FIG. 2) based on the correction value to the head controller 23 to adjust the intensity of the light emitted from the light-emitting element 21. Incidentally, the control signal can be generated using, for instance, a digital potentiometer. The control signal is outputted to the head controller 23 via the cable 3.

After the adjustment is performed by the intensity adjuster 63, the signal adjuster 64 adjusts the multiphase sine wave signal outputted in accordance with the intensity of the light received by the light-receiving element 22. Specifically, the signal adjuster 64 calculates a correction value for the adjustment in accordance with the status of the multiphase sine wave signal inputted from the head controller 23 via the cable 3 when the detecting head 2 is moved relative to the scale Sc, and adjusts the amplitude and the center voltage of the multiphase sine wave signal based on the correction value.

Incidentally, the amplitude and the center voltage of the multiphase sine wave signal can be adjusted using, for instance, a digital potentiometer.

Further, the correction value can be calculated by detecting peaks of the multiphase sine wave signal in a plurality of cycles and averaging the peaks to calculate the intensity and the center voltage of the multiphase sine wave signal. The correction value is stored in a memory (not shown) of the connector controller 6. Power is supplied to the linear encoder 1 via the external equipment connected to the connector 4. When the linear encoder 1 is powered on, the connector controller 6 reads the correction value from the memory and adjusts the amplitude and center voltage of the multiphase sine wave signal based on the correction value.

Further, the connector controller 6 is connected to the USB connector 47 so as to be controlled by an external processor such as a PC (Personal Computer) that is connected to the connector 4 via a USB cable.

Specifically, under the control of the external processor, the connector controller 6 is adapted to, for instance, output to the external processor the multiphase sine wave signal outputted by the head controller 23. Then, the external processor analyzes the multiphase sine wave signal inputted by the connector controller 6 to diagnose, for instance, malfunctions caused on the linear encoder 1.

Further, under the control of the external processor, the connector controller 6 is adapted to be controlled to command to the intensity adjuster 63 and the signal adjuster 64 to adjust the multiphase sine wave signal outputted in accordance with the intensity of the light emitted by the light-emitting element 21 and the intensity of the light received by the light-receiving element 22. Thus, when, for instance, a plurality of the linear encoders 1 are used for measurement, each of the linear encoders 1 can be simultaneously adjusted.

Attachment Process and Adjustment Process of the Optical Encoder

Next, an attachment process for attaching the scale Sc and the detecting head 2 of the linear encoder 1 to two objects to be measured that are relatively displaceable, and adjustment process of the linear encoder 1 will be described below.

A user of the linear encoder 1 attaches the scale Sc and the detecting head 2 to the respective objects to be measured while viewing emission statuses of the LEDs 51 to 55 of the display 5 so that the center LED 53 is lit. Then, after the scale Sc and the detecting head 2 are attached to the respective objects, the user pushes the CAL switch 421 or the CAL switch 432 in order to adjust the multiphase sine wave signal outputted in accordance with the intensity of the light emitted from the light-emitting element 21 and the intensity of the light received by the light-receiving element 22.

Figure 5:
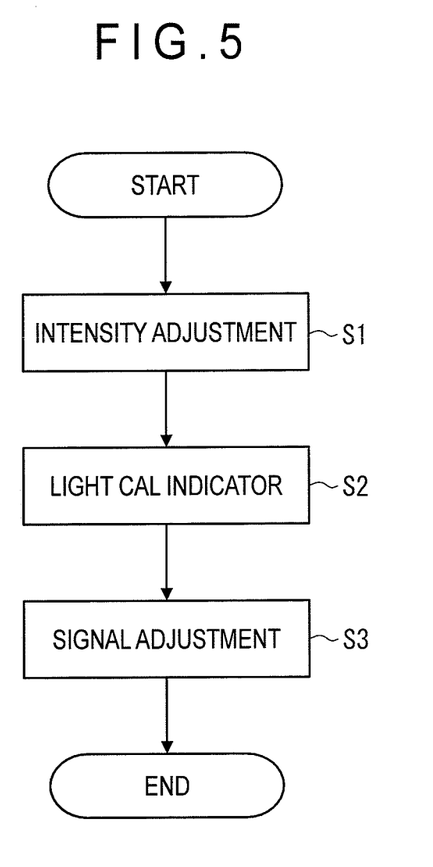
FIG. 5 is a flow chart showing an adjustment process of the optical encoder according to the first exemplary embodiment.

FIG. 5 is a flow chart showing the adjustment process of the linear encoder 1.

When the CAL switch 421 or the CAL switch 432 is pushed down, the connector controller 6 executes the following steps S1 to S3 as shown in FIG. 5.

Specifically, the intensity adjuster 63 adjusts the intensity of the light emitted from the light-emitting element 21 in accordance with the intensity of the light received by the light-receiving element 22 (S1: intensity adjustment step). Incidentally, after the user pushes the CAL switch 421 or the CAL switch 432, the user can adjust the intensity of the light emitted from the light-emitting element 21 by the intensity adjuster 63 without moving the detecting head 2 relative to the scale Sc.

When the intensity of the light emitted from the light-emitting element 21 is adjusted by the intensity adjuster 63, the connector controller 6 lights the CAL indicator 433 to notify that the adjustment is performed by the intensity adjuster 63 (S2: notification step). Then, upon recognizing the completion of the adjustment by the intensity adjuster 63 in view of the CAL indicator 433, the user moves the detecting head 2 relative to the scale Sc.

When the detecting head 2 is moved relative to the scale Sc, the signal adjuster 64 adjusts the multiphase sine wave signal outputted based on the intensity of the light received by the light-receiving element 22 (S3: signal adjustment step).

The above steps S1 to S3 are performed so that the multiphase sine wave signal outputted in accordance with the intensity of the light emitted from the light-emitting element 21 and the intensity of the light received by the light-receiving element 22 is adjusted.

The above-described exemplary embodiment provides the following advantages:

(1) The connector 4 includes the display 5 for displaying the status of the light received by the light-receiving element 22 and is connected to the detecting head 2 via the cable 3. Accordingly, the display 5 can be easily seen even while the detecting head 2 is moved relative to the scale Sc. Thus, a user can easily adjust the positional relationship between the scale Sc and the detecting head 2.

(2) Since the phase difference of the multiphase sine wave signal is 90 degrees, the amplitude calculator 61 can calculate the amplitude of the multiphase sine wave signal based on the predetermined center voltage of the multiphase sine wave signal and an instantaneous value of the multiphase sine wave signal. Further, since the display controller 62 controls the display 5 based on the amplitude of the multiphase sine wave signal, the status of the light received by the light-receiving element 22 can be displayed on the display 5 without moving the detecting head 2 relative to the scale Sc.

(3) Since the display 5 is provided at the slant portion 431, when, for instance, a plurality of the linear encoders 1 are used for measurement with a plurality of connectors 4 thereof being arranged in a predetermined direction to be connected with external equipments, the display 5 can be viewed in a direction along the cable face 42. Further, since the CAL switch 421, which is provided on each of the cable faces 42 can be operated from the side where the cable face 42 is located in the above circumstance. Accordingly, a user can easily adjust the positional relationship between the scale Sc and the detecting head 2 so that the signal outputted in accordance with the intensity of the light emitted by the light-emitting element 21 and the intensity of the light received by the light-receiving element 22 can be easily adjusted.

(4) The connector controller 6 includes the intensity adjuster 63 that conducts the adjustment when the CAL switch 421 or the CAL switch 432 is pushed down and the signal adjuster 64 that conducts the adjustment after the adjustment by the intensity adjuster 63. Accordingly, a user can automatically adjust the intensity of the light emitted by the light-emitting element 21 by pushing the CAL switch 421 or the CAL switch 432, so that the multiphase sine wave signal outputted in accordance with the light received by the light-receiving element 22 can be automatically adjusted.

(5) Since the display controller 62 is adapted to display the status of the light received by the light-receiving element 22 on the display 5, after a user pushes the CAL switch 421 or the CAL switch 432, the user can adjust the intensity of the light emitted from the light-emitting element 21 without moving the detecting head 2 relative to the scale Sc. Then, upon recognizing the completion of the adjustment by the intensity adjuster 63 through the CAL indicator 433, the user can adjust the multiphase sine wave signal outputted in accordance with the intensity of the light received by the light-receiving element 22 by moving the detecting head 2 relative to the scale Sc. Accordingly, the user can easily adjust the multiphase sine wave signal outputted in accordance with the intensity of the light emitted from the light-emitting element 21 or the intensity of the light received by the light-receiving element 22.

(6) The display 5 is provided by arranging the five LEDs 51 to 55 in the predetermined direction and different one of the LEDs 51 to 55 is lit depending on the intensity of the light received by the light-receiving element 22, so that the status of the light received by the light-receiving element 22 can be easily recognized only by viewing the display 5.

Second Exemplary Embodiment

A second exemplary embodiment of the invention will be described below with reference to the attached drawings. It should be noted that, in the following description, the components that have already been explained will be designated by the same reference numerals to avoid repetition.

Figure 6:
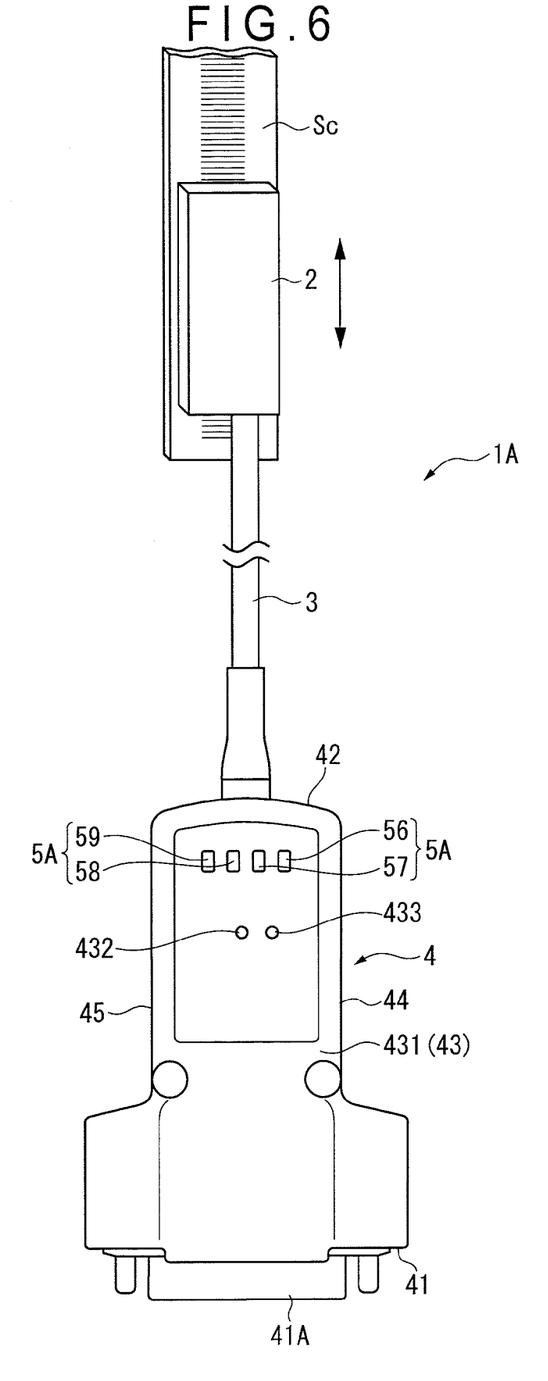
FIG. 6 is a plan view showing an optical encoder according to a second exemplary embodiment of the invention.
Figure 7:
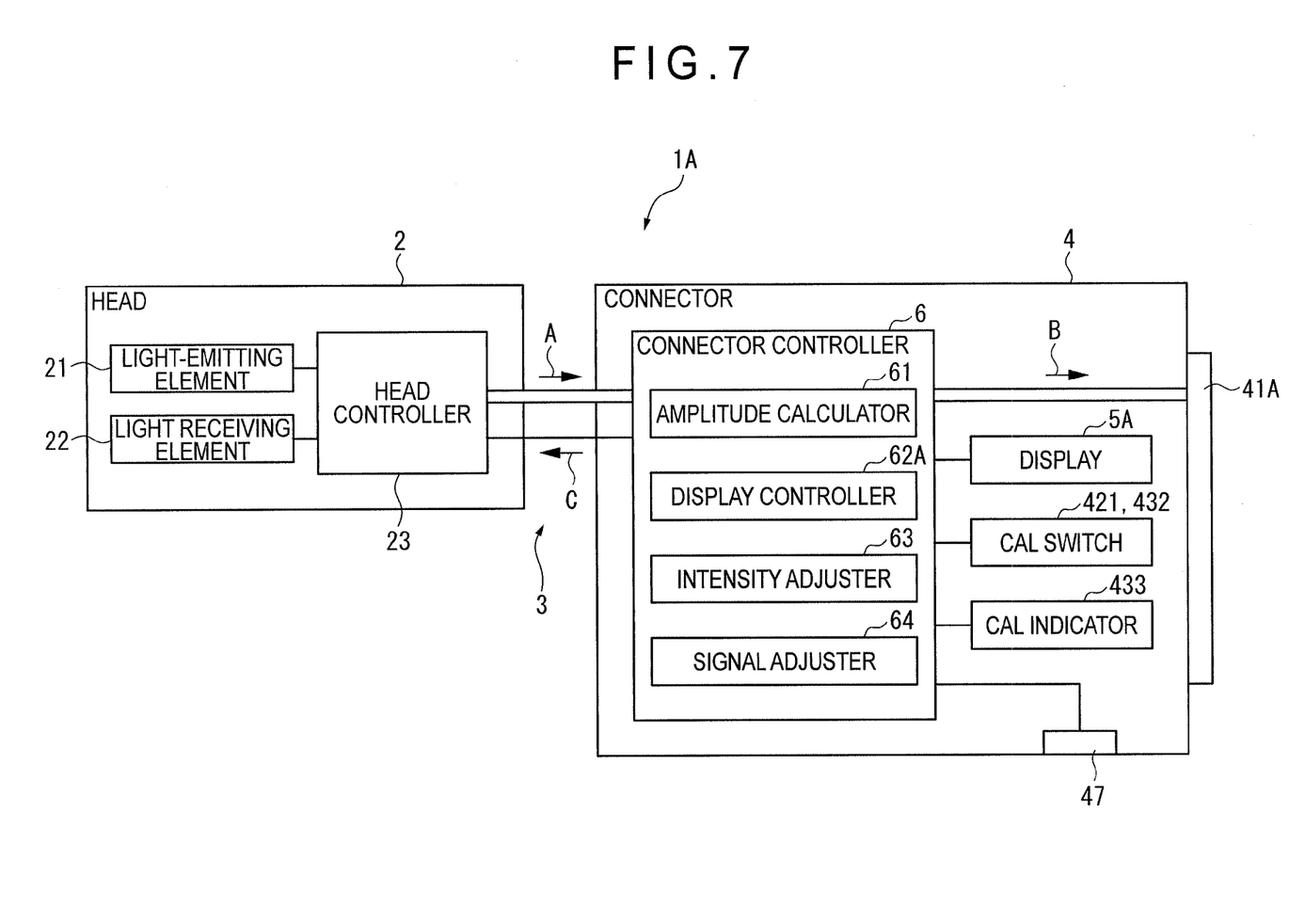
FIG. 7 is a block diagram showing an overall arrangement of the optical encoder according to the second exemplary embodiment.

FIG. 6 is a plan view showing a linear encoder 1A according to the second exemplary embodiment of the invention. FIG. 7 is a block diagram showing an overall arrangement of the linear encoder 1A.

In the first exemplary embodiment, the display 5 is provided by the five LEDs 51 to 55 that are arranged in parallel with the terminal face 41 and the cable face 42.

In contrast, a display 5A in the second exemplary embodiment is provided by four LEDs 55 to 59 that are arranged in parallel with the terminal face 41 and the cable face 42.

The emission color of the two center LEDs 57 and 58 is green; the emission color of the LEDs 56 and 59 on both ends is red.

Further, in the first exemplary embodiment, when the amplitude of the multiphase sine wave signal calculated by the amplitude calculator 61 is within a predetermined range, the display controller 62 lights the center LED 53; when the amplitude surpasses the predetermined range, the display controller 62 lights the LED 54 or 55 disposed at one side relative to the center; and when the amplitude is below the predetermined range, the display controller 62 lights the LED 51 or 52 disposed at the other side relative to the center.

In contrast, when the amplitude of the multiphase sine wave signal calculated by the amplitude calculator 61 is within a predetermined range, a display controller 62A of the second exemplary embodiment lights the two center LEDs 57 and 58; when the amplitude surpasses the predetermined range, the display controller 62A lights the LED 58 and/or 59 (left side in FIG. 6) disposed at one side relative to the center; and when the amplitude is below the predetermined range, the display controller 62A lights the LED 57 and/or 56 (right side in FIG. 6) disposed at the other side relative to the center.

Incidentally, the display controller 62A lights the LEDs 56 to 59 in a stepwise manner in accordance with the intensity of the light received by the light-receiving element 22. The intensity of the light is the smallest when the LED 56 is lit and is the largest when the LED 59 is lit.

The second exemplary embodiment provides advantages similar to those of the first exemplary embodiment.

Modifications of Embodiments

Incidentally, it should be understood that the scope of the present invention is not limited to the above-described exemplary embodiment(s) but includes modifications and improvements as long as the modifications and improvements are compatible with the invention.

For instance, in the above exemplary embodiments, the connector controller 6 includes the amplitude calculator 61 that calculates the amplitude of the multiphase sine wave signal, i.e. the intensity of the light received by the light-receiving element 22, based on the predetermined center voltage of the multiphase sine wave signal outputted by the head controller 23 and the instantaneous value of the multiphase sine wave signal. However, the controller may be arranged to detect the intensity of the light received by the light-receiving element using a comparator circuit or the like in the same manner as the optical encoder disclosed in the Patent Literature 2. In other words, it is only required for the controller to have a display controller that controls the display based on an electric signal outputted in accordance with the intensity of the light received by the light-receiving element.

In the above exemplary embodiments, the slant portion 431 is provided on the upper face 43 of the connector 4 and the displays 5 and 5A are provided on the slant portion 431. However, the displays 5 and 5A may not be provided on the slant portion 431 and, further, may not be provided on the upper face 43. Specifically, the displays 5 and 5A may be provided on the cable face 42 or on the bottom face 46. In other words, the display may be provided anywhere on the connector.

Though the slant portion 431 is flat in the above exemplary embodiments, the slant portion 431 may be curved or the like. In other words, it is only required for the slant portion to be slanted and narrowed toward the cable face.

Further, though the slant portion 431 is slanted and narrowed toward the cable face 42 in the above exemplary embodiments, the slant portion 431 may be slanted and narrowed in the other direction.

Though the connector 4 is rectangular parallelepiped in the above exemplary embodiments, the connector 4 may be provided as a semi-ellipsoid or the like.

Though the rubber cover 441 is attached to the lateral face 44 in the above exemplary embodiments, a plastic cover may be attached to the lateral face 44 by a screw or the like.

Though multiphase sine wave signal is exemplarily used as the multiphase sine wave signal in the above exemplary embodiments, the multiphase sine wave signal may be a triphasic sine wave signal or a four-phase sine wave signal.

Though the intensity adjuster 63 adjusts the intensity of the light emitted from the light-emitting element 21 in accordance with the intensity of the light received by the light-receiving element 22 in the above exemplary embodiments, the intensity adjuster 63 may adjust the multiphase sine wave signal, i.e. the intensity of the electric signal, in accordance with the intensity of the light received by the light-receiving element 22. Incidentally, the intensity of the electric signal can be adjusted by, for instance, an amplifier.

In the above exemplary embodiments, the connector 4 includes the CAL switches 421 and 432, the CAL indicator 433 and the intensity adjuster 63 and the signal adjuster 64 in order to automatically adjust the multiphase sine wave signal outputted in accordance with the intensity of the light emitted by the light-emitting element 21 and the intensity of the light received by the light-receiving element 22. However, these functions may not be provided.

In the first exemplary embodiment, the display 5 is provided by the five LEDs 51 to 55 that are arranged in parallel with the terminal face 41 and the cable face 42. However, the display may be provided by three LEDs arranged in a predetermined direction or, alternatively, may be provided by seven or more odd number of LEDs arranged in a predetermined direction. In other words, it is only required for the display in the first exemplary embodiment to have three or more odd number of LEDs arranged in a predetermined direction.

In the second exemplary embodiment, the display 5A is provided by the four LEDs 56 to 59 that are arranged in parallel with the terminal face 41 and the cable face 42. However, the display may be provided by two LEDs arranged in a predetermined direction or, alternatively, may be provided by six or more even number of LEDs arranged in a predetermined direction. In other words, it is only required for the display in the second exemplary embodiment to have two or more even number of LEDs arranged in a predetermined direction.

Further, a single LED may be provided instead of the display 5 provided by the five LEDs 51 to 55 in the first exemplary embodiment and the display 5A provided by the four LEDs 56 to 59 in the second exemplary embodiment. In this arrangement, the status of the light received by the light-receiving element may be indicated by altering the emission color in a manner similar to the optical encoder disclosed in the Patent Literature 2 or, alternatively, the status of the light received by the light-receiving element may be indicated by altering the emission state (e.g. flashing) of the LED. Further, the display may be provided by a liquid crystal display and the like. In other words, it is only required for the display to be capable of indicating the status of the light received by the light-receiving element.

In the above exemplary embodiments, the linear encoder 1 is arranged to receive the light reflected by the scale Sc by the light-receiving element 22. However, the optical encoder may be arranged to receive the light passing through the scale by the light-receiving element.

In the above exemplary embodiment, though the linear encoder 1 is used as an example of the optical encoder, the present invention is applicable to, for instance, an optical rotary encoder.

What is claimed is:

1. An optical encoder, comprising:
    a scale that has latticed scale markings;
    a detecting head that comprises a light-emitting element that emits light onto the scale and a light-receiving element that receives the light emitted by the light-emitting element to be reflected or transmitted by the scale; and
    a connector connected to the detecting head via a cable, the optical encoder measuring a position of the detecting head relative to the scale based on the light received by the light-receiving element,
    wherein the connector comprises a display that displays a status of the light received by the light-receiving element and a controller that controls the display,
    the controller comprises a display controller that controls the display based on an electric signal outputted in accordance with an intensity of the light received by the light-receiving element,
    the optical encoder is arranged as an incremental optical encoder that employs a multiphase sine wave signal with a predetermined center voltage as the electric signal,
    the controller comprises an amplitude calculator that calculates an amplitude of the multiphase sine wave signal based on the predetermined center voltage of the multiphase sine wave signal and an instantaneous value of the multiphase sine wave signal, and
    the display controller controls the display based on the amplitude of the multiphase sine wave signal calculated by the amplitude calculator.

2. The optical encoder according to claim 1,
    wherein the connector is a substantially rectangular parallelepiped that has a terminal face at which a terminal is provided and a cable face provided opposite to the terminal face and receiving the cable,
    a slant portion that is slanted and narrowed toward the cable face is provided on an orthogonal face that is orthogonal to the terminal face and the cable face, and
    the display is provided on the slant face.

3. The optical encoder according to claim 2,
    wherein the controller comprises an intensity adjuster that adjusts at least one of an intensity of the light emitted from the light-emitting element and an intensity of the electric signal in accordance with the intensity of the light received by the light-receiving element, and
    the connector comprises operation units, the operation units being provided respectively on the orthogonal face and the cable face, the operation units effecting an adjustment of the intensity adjuster.

4. The optical encoder according to claim 3,
    wherein the controller comprises a signal adjuster that, after the adjustment by the intensity adjuster is done, adjusts the electric signal, and
    the connector comprises a notifier that notifies that the adjustment by the intensity adjuster is done.

5. The optical encoder according to claim 1,
    wherein the display is provided by three or more odd number of LEDs that are arranged in a predetermined direction, and
    the display controller lighting:
    a center one of the LEDs when the intensity of the light received by the light-receiving element is within a predetermined range;
    a first-side one of the LEDs disposed at a first side relative to the center when the intensity of the light received by the light-receiving element surpasses the predetermined range; and
    a second-side one of the LEDs disposed at a second side relative to the center when the intensity is below the predetermined range.

6. The optical encoder according to claim 1,
    wherein the display is provided by two or more even number of LEDs that are arranged in a predetermined direction, and
    the display controller lighting:
    two LEDs disposed at a center of the LEDs when the intensity of the light received by the light-receiving element is within a predetermined range;
    a first-side one of the LEDs disposed at a first side relative to the center when the intensity of the light received by the light-receiving element surpasses the predetermined range; and
    a second-side one of the LEDs disposed at a second side relative to the center when the intensity is below the predetermined range.

* * * * *